US005541362A

United States Patent [19]
Reinert, Sr.

[11] Patent Number: 5,541,362
[45] Date of Patent: Jul. 30, 1996

[54] ALIGNMENTS ADJUSTMENTS ASSEMBLY APPARATUS AND METHOD

[76] Inventor: Gary L. Reinert, Sr., 4319 Middle Rd., Allison Park, Pa. 15101

[21] Appl. No.: 2,014

[22] Filed: Jan. 8, 1993

[51] Int. Cl.⁶ ............................................. F21S 1/02
[52] U.S. Cl. .................. 174/37; 174/48; 362/153.1; 362/285; 362/418
[58] Field of Search ............... 174/37, 48; 362/153, 362/153.1, 145, 285, 366, 418

[56] References Cited

U.S. PATENT DOCUMENTS

| | | | |
|---|---|---|---|
| 3,956,573 | 5/1976 | Myers et al. | 174/48 |
| 4,382,274 | 5/1983 | De Backer et al. | 362/153 |
| 4,622,435 | 11/1986 | Trainor et al. | 174/57 |
| 4,914,544 | 4/1990 | Dahlberg | 362/153.1 |
| 4,924,364 | 5/1990 | Pannier | 362/153.1 |

FOREIGN PATENT DOCUMENTS

| | | |
|---|---|---|
| 0716501 | 6/1968 | Belgium . |
| 0837976 | 1/1976 | Belgium . |

OTHER PUBLICATIONS

U.S. Department of Transportation, Federal Aviation Administration, Advisory Circular, AC No. 150/5345–42C "Specification for Airport Light Bases, Transformer Housings, Junction Boxes, and Accessories," dated Jun. 8, 1989, pp. 1–iv, 1–34.

*Primary Examiner*—Kristine L. Kincaid
*Assistant Examiner*—Paramita Ghosh
*Attorney, Agent, or Firm*—Douglas G. Glantz

[57] ABSTRACT

The invention refers to a height and azimuth alignment adjustments assembly which is utilized for the precise and simplified adjusting of the heights of embedded containers and for the aligning of its light fixture with respect to a straight line. These containers are installed in airport runways, taxiways and other aircraft traffic areas to serve as bases for lighting fixtures, transformer housings and junction boxes. The adjustments take place both, when the containers and their lights are initially installed as well as when the runways, taxiways and other aircraft traffic areas are resurfaced.

18 Claims, 2 Drawing Sheets

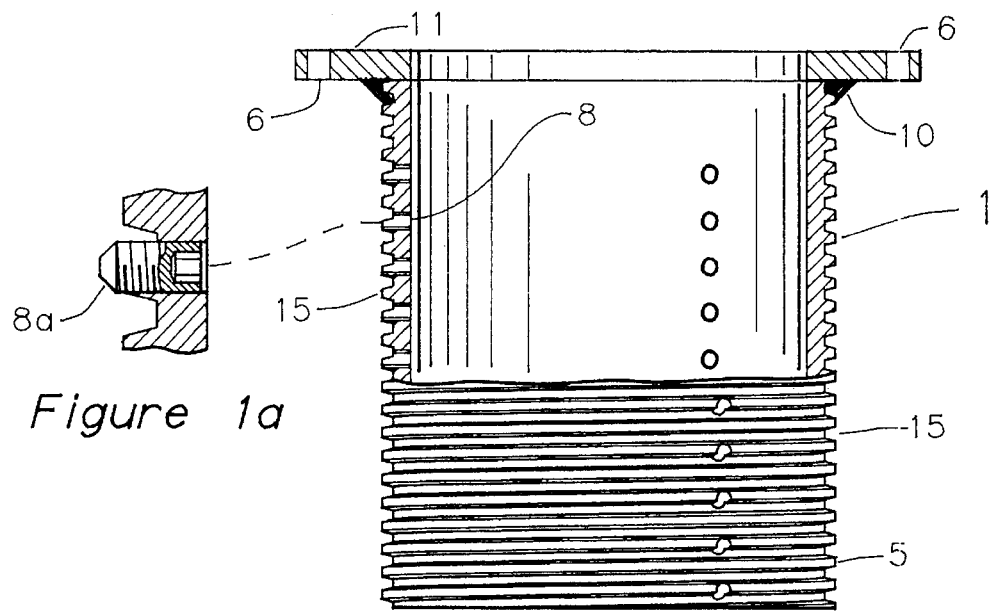
Figure 1a
Figure 1
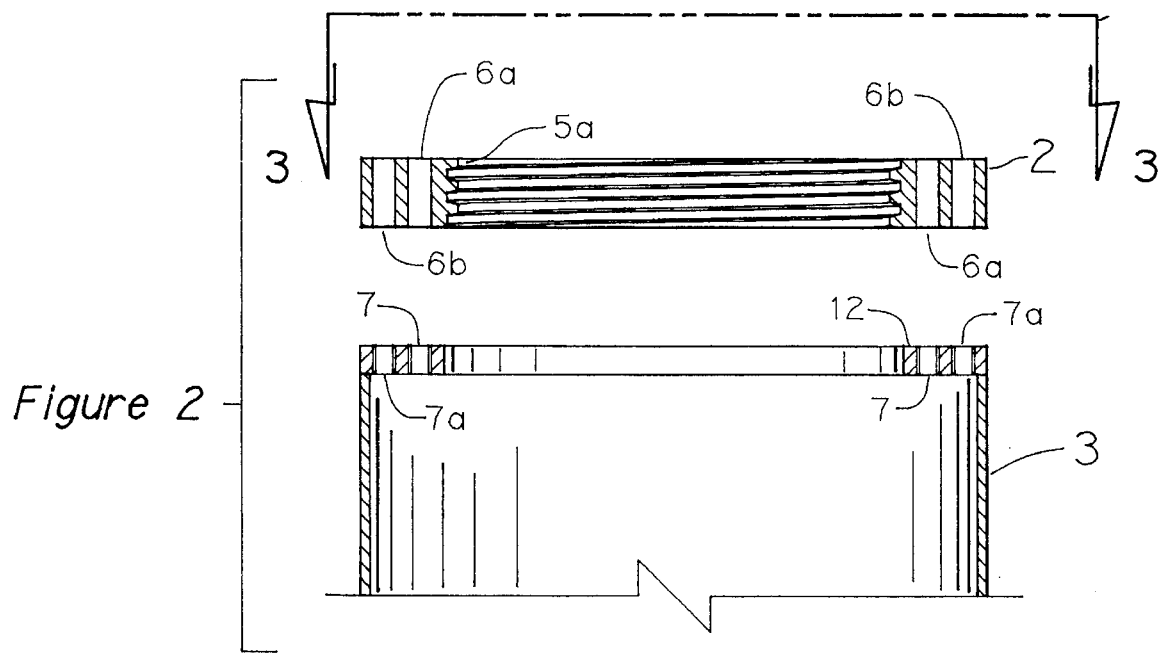
Figure 2

ALIGNMENTS ADJUSTMENTS ASSEMBLY APPARATUS AND METHOD

BACKGROUND OF THE INVENTION

In the installation of airport runway touchdown zone, centerline and edge lighting systems, as well as in the installation of taxiway centerline and edge lighting systems, and other lighting systems, certain steel containers are utilized. These containers are embedded in the runway, taxiway and other pavements at the time these runway and taxiway pavements are poured.

These containers, hereinafter referred to as embedded containers, vary in length and diameter and provide an inverted flange at their top portion, which has a standard set of threaded holes to allow for the runway, taxiway, edge and other light fixtures to be bolted onto them above the pavement surface. These light fixtures, otherwise known as airport inset lights, have to be aligned with respect to each other in a perfectly straight line, in the horizontal plane.

These embedded containers below the pavement surface serve as light fixture bases. They also serve as transformer housings and junction boxes. Depending on the location where these containers are installed they are exposed to varying degrees and types of forces applied to them by the aircraft and other vehicular traffic in that location. For example, runway and taxiway centerline light fixtures and the containers they are bolted onto are subjected to direct aircraft and other heavy vehicular loading applied to the top flange of the container and transmitted down to its walls.

When a runway, taxiway and other aircraft traffic area are first built, or when upgrading, modernization or maintenance projects require their re-surfacing (repavement), the flanges on the embedded containers get buried under the pavement. This creates the need for height adjusting devices with flanges identical to those of the embedded containers, in order to adapt said container up to the final surface and for the lighting fixtures to be installed and aligned above the pavement. In many instances this requires core-drilling the newly poured pavement in order to reach down to the now buried top flange of the embedded container.

Depending on the lengths of the runways and taxiways, thousands of these embedded containers are affected and a wide variety of height adjustments is involved for each given size of embedded containers.

At present fixed-length extensions, which have to be made in many different lengths, are utilized to provide the many different gross height adjustments. A combination of one or more flat spacer rings, which are manufactured in thicknesses of 1/16, 1/8, 1/4 and 1/2 of one inch and others, is used to provide the final height.

These fixed-length extensions have one inverted flange on each end in order to bolt it onto Embedded Container 3, then flat rings are added on top of the fixed-length extension top flange before the lighting fixture is bolted on to said flange.

The fixed-length extensions and the spacer rings, both the tubular types as well as the flat types, have to be individually ordered to meet the required length. This means:

1) Field measurements of each individual fixed extension length is required for every container.

2) Record keeping of those measurements for ordering and verification.

3) Ordering, receiving and delivering each size to its location, and to the field.

4) Frequently having to install more than one fixed-length extension and more than one flat ring in order to achieve the required height.

The complications in the installation listed above are further magnified by the fact that the embedded containers are made in 4 different sizes: 10, 12, 15 and 16 inches in diameter.

One additional aspect of the installation of the light fixtures upon the embedded containers is their alignment with respect to one another in a perfectly straight line, known as azimuth correction or alignment.

It is therefore a principal object of the invention to provide a method and means for adjusting with precision the height of embedded containers and for aligning, with great simplicity and precision, the light fixture that is installed upon it. The means by which the precise height adjustments and the precise azimuth corrections will be made is herein generally described as the adjustment assembly.

A further object of the invention is to provide a method and means for adjusting the height of embedded containers without having to install individual fixed length extensions and flat rings.

These and other objects of this invention will be apparent to those skilled in the art.

BRIEF DESCRIPTION OF THE DRAWINGS

FIG. 1 shows a front elevational view, partially in section, of the adjustable height extension apparatus of the present invention.

FIG. 1a shows a front elevational view, partially in section, of locking means in connection with the adjustable height extension apparatus of the present invention.

FIG. 2 shows a front elevational view, partially in section, of the adapter flange and container apparatus of the present invention.

SUMMARY OF THE INVENTION

Figure 3:
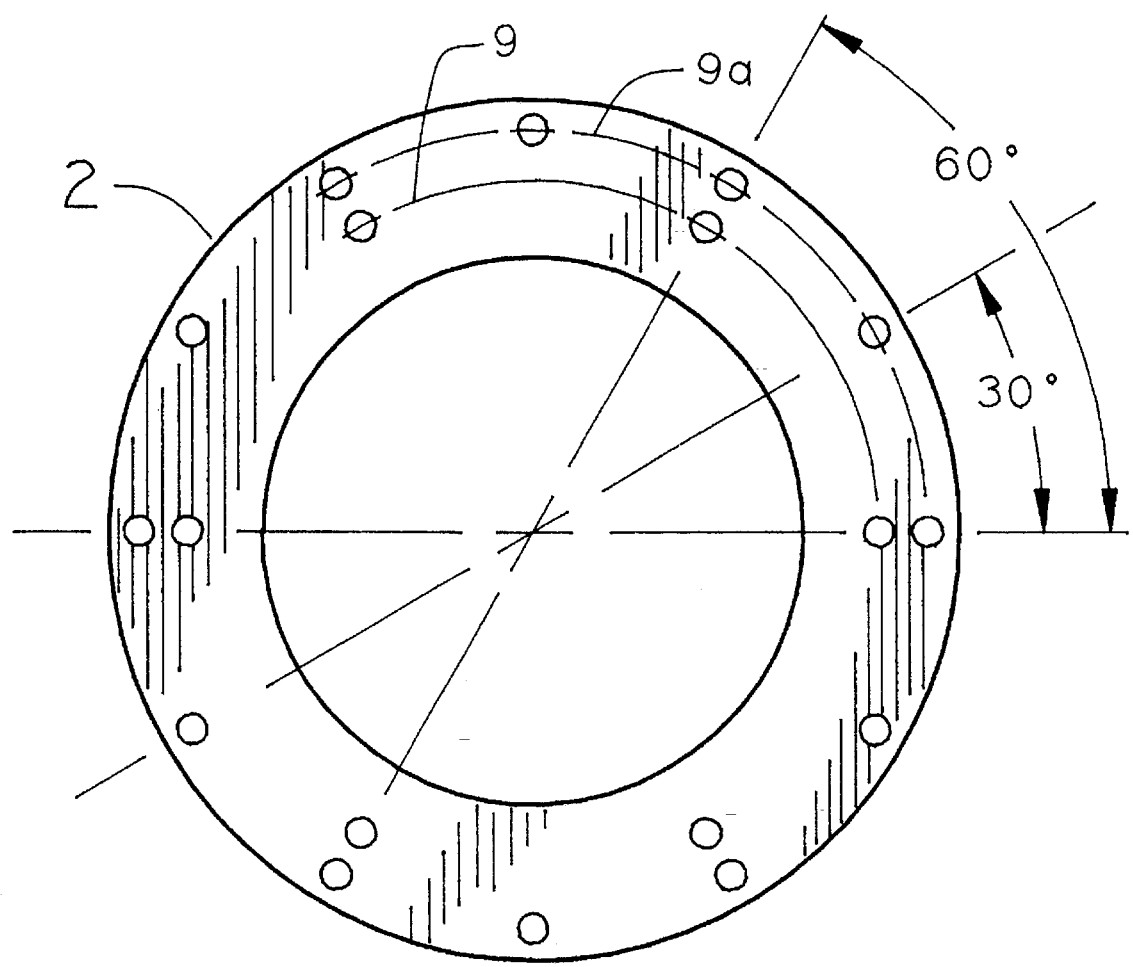
FIG. 3 shows a top view of the adapter flange apparatus of the present invention.

A method and means for adjusting the height of embedded containers comprise an inside Acme threaded adapter flange with two bolt circles/patterns. This Adapter Flange 2 bolts onto one of the two possible bolt circles/patterns that can be found on the embedded container's flange. The method and means also comprise an outside acme threaded adjustable extension, which threads down into the adapter flange in order to provide the precise height required and the precise azimuth alignment of its light fixture and which adjustable extension has at its top a flange in order to provide a base upon which the specified light fixture can be bolted.

These two components are generally described as the adjustment assembly.

DESCRIPTION OF THE PREFERRED EMBODIMENT

Referring to the drawing, the numeral 1 generally designates the Adjustable Extension; 2 designates the Adapter Flange; 1 and 2 combined designate the Adjustment Assembly; 3 designates the container whose height is to be adjusted upwardly; 9 and 9a designate the two bolt circles/bolt patterns for Adapter Flange 2.

As described in the Summary of the invention, this invention consists of two components: an Adjustable Extension 1 and an Adapter Flange 2 which combined become the Adjustment Assembly 1, 2.

Adjustable Extension 1 is of tubular form and it has Acme Threads 5 on its outside surface; four threads per inch have been proven to provide a smooth, precise and quick height adjustment capability. Adjustable Extension 1 has Flange 11 continuously welded 10 to its upper end. The bolt circle on Flange 11 and the bolt circle on the light fixture are identical because Flange 11 is to be used as the new base for installing the lighting fixtures that were previously bolted to inverted Flange 12 on Embedded Container 3, or for installing new ones if the old lighting fixtures are replaced or if it is a completely new installation.

Adjustable Extension 1, along Wall 15 of its tubular body, has ten sets of three each threaded Holes 8, at 120 degrees from one another, threaded for ⅜ of one inch, stainless steel, Allen Set Screws 8a.

Said Allen Set Screws 8a provide the means for locking Adjustable Extension 1 on to Adapter Flange 2.

Adapter Flange 2 has its inside surface threaded with four Acme Threads 5a, the same threads as the Adjustable Extension 1, which will be threaded into said Adapter Flange 2. Adapter Flange 2 has two bolt circles/patterns 9 and 9a in order to be able to install Adapter Flange 2 on any of the two possible Embedded Containers 3: the one piece container or the sectional container. Adapter Flange Holes 6a and 6b are not threaded and they are large enough to allow for an easy alignment with Holes 7 or 7a, whichever one is found on inverted Flange 12 of Embedded Container 3, to which Adapter Flange 2 is to be bolted on.

The adjustment process starts by bolting Adapter Flange 2 on to Embedded Container Flange 12. Once this is done, the height and azimuth adjustments are achieved by threading Adjustable Extension 1 down into Adapter Flange 2 up to the precise height adjustment and the precise azimuth alignment required. The light fixture has to be temporarily bolted onto Flange 11, in order to do the adjustments, two bolts are sufficient for this purpose. Tick marks are made on the pavement, the light fixture and Adapter Flange 2 before the light fixture is removed. After removing the light fixture, the Adjustable Extension 1 is firmly secured in that position, to Adapter Flange 2 by means of three stainless steel Allen Set Screws 8a, which are threaded in through Holes 8, drilled and tapped on Wall 15 of Adjustable Extension 1. Said Screws 8a also provide the required resistance to torque applied perpendicularly to the vertical axis of Adjustable Extension 1.

Embedded Container 3 as well as Adapter Flange 2 and Adjustable Extension 1, once set in their concrete embedment, are never again removed.

Thus, it can be seen that a novel method and means has been provided for adjusting the heights and azimuth of embedded containers that are used for light bases, transformer housings and junction boxes, in a manner that assures:

1. That the heights can be adjusted with a greater precision because an Acme threaded adjustment assembly has been introduced, which allows increases in heights as small as ¹⁄₆₄ of one inch.

2. That the light fixtures can be aligned with respect to one another in a perfectly straight line, with great precision and simplicity, because the flange upon which the light fixture is bolted can be rotated in the horizontal plane any number of degrees required for azimuth correction.

3. That no fixed-length extensions and no flat spacer rings be required for height adjustments because an adjustable extension is provided with which precise adjustments can be easily made to any of the required heights.

Thus, it can be seen that the invention accomplishes at least all of its stated objectives.

What is claimed is:

1. An alignment adjustment assembly apparatus, comprising:
   (a) a light fixture support base for placement as a partially embedded light fixture in an airport runway, taxiway, or other aircraft ground traffic area;
   (b) a fixed connecting flange on said light fixture support base for holding an airport inset light; and
   (c) variable length extension assembly means connected to said fixed connecting flange for adjusting the height and alignment of the airport inset light supported by said light fixture support base, said variable length extension assembly means comprising:
   (d) an extension adapter flange having connecting means for attachment to said fixed connecting flange on said light fixture support base; and
   (e) a light support extension canister for holding said airport inset light and having screw threading means for rotatable attachment to said extension adapter flange.

2. An alignment adjustment assembly apparatus as set forth in claim 1, wherein said variable length extension assembly means is rotatably adjustable for adjusting the height and alignment of said airport inset light supported by said light fixture support base.

3. An alignment adjustment assembly apparatus as set forth in claim 2, wherein said variable length extension assembly means is rotatably adjustable for adjusting the azimuth alignment of said airport inset light supported by said light fixture support base by plus or minus one degree or more.

4. An alignment adjustment assembly apparatus as set forth in claim 2, wherein said variable length extension assembly means is rotatably adjustable for adjusting the height of said airport inset light supported by said light fixture support base by plus or minus 0.02 inches or more.

5. An alignment adjustment assembly apparatus as set forth in claim 2, wherein said screw threading means comprises an inside thread on said extension adapter flange and an outside thread on said light support extension canister.

6. An alignment adjustment assembly apparatus as set forth in claim 2, wherein said light support extension canister can be rotated to align the azimuth of said airport inset light with respect to the horizon and to other airport inset lights.

7. An alignment adjustment assembly apparatus as set forth in claim 6, wherein said light support extension canister can be rotated any number of degrees to align the azimuth of said airport inset light with respect to the horizon and to other airport inset lights.

8. An alignment adjustment assembly apparatus as set forth in claim 7, wherein inside and outside threads comprise an Acme screw thread of at least 4 threads per inch.

9. An alignment adjustment assembly apparatus as set forth in claim 2, wherein said light support extension canister further comprises light attachment means on the top surface thereof for securing said airport inset light to said light support extension canister.

10. An alignment adjustment assembly apparatus as set forth in claim 9, wherein said light attachment means comprises a plurality of bolt holes spaced apart in a top flange of said light support extension canister.

11. An alignment adjustment assembly apparatus as set forth in claim 10, wherein said light attachment means comprises at least 6 bolt holes spaced apart in the top flange of said light support extension canister.

12. An alignment adjustment assembly apparatus as set forth in claim 10, wherein said light attachment means comprises at least 12 bolt holes substantially equally spaced and positioned about 30 degrees apart in the top flange of said light support extension canister.

13. An alignment adjustment assembly apparatus as set forth in claim 10, wherein said variable length extension assembly means further comprises rotation locking means for securing said light support extension canister against rotation through said screw threading means connected to said extension adapter flange.

14. An alignment adjustment assembly apparatus as set forth in claim 13, wherein said rotation locking means for securing said light support extension canister against rotation comprises an Allen screw set in side wall of said light support extension canister and positioned for rotation locking contact with said extension adapter flange.

15. An alignment adjustment assembly apparatus as set forth in claim 2, wherein said extension adapter flange comprises a first circular series of at least 6 bolt holes spaced apart in the top surface of said light support extension canister and a second circular series, concentric to said first circular series, of at least 12 bolt holes substantially equally spaced and positioned about 30 degrees apart in the top flange of said light support extension canister.

16. A method of adjusting the height and alignment of an airport inset light, comprising:
   (a) providing a light fixture support for an airport runway, taxiway, or other aircraft ground traffic area, said light fixture support containing a base for embedded placement in said airport runway, taxiway, or other aircraft ground traffic area and a fixed connecting flange on said base for holding an airport inset light; and
   (b) providing a rotatably adjustable fixture extension to adjust the height and alignment of an airport inset light supported by said light fixture support base by providing an extension adapter flange having connecting means for attachment to said fixed connecting flange on said light fixture support base and providing a light support extension canister for holding light said airport inset light and having screw threading means for rotatable attachment to said extension adapter flange, whereby said light support extension canister can be rotated to align the azimuth of said airport inset light with respect to the horizon and to other airport inset lights.

17. A method of adjusting the height and alignment of an airport inset light as set forth in claim 16, further comprising rotatably adjusting the azimuth alignment of said airport inset light supported by said light fixture support base by plus or minus one degree or more and the height of said light by plus or minus 0.02 inches or more.

18. An airport inset lights alignment adjustment assembly apparatus, comprising:
   (a) a light fixture support base for placement as a partially embedded light fixture in an airport runway, taxiway, or other aircraft ground traffic area;
   (b) a fixed connecting flange on said light fixture support base for holding an airport inset light;
   (c) variable length extension assembly means connected to said fixed connecting flange for rotatably adjusting the azimuth alignment of light the airport inset light supported by said light fixture support base by plus or minus one degree or more and for rotatably adjusting the height of an airport inset light supported by said light fixture support base by plus or minus 0.02 inches or more, said variable length extension assembly means comprising;
   (d) an extension adapter flange having connecting means for attachment to said fixed connecting flange on said light fixture support base;
   (e) a light support extension canister having outside screw threading means for rotatable attachment to an inside thread on said extension adapter flange provided by an Acme screw thread of at least 4 threads per inch;
   (f) light attachment means on the top surface of said light support extension canister for securing inset the airport inset light to at least one of a plurality of at least 12 bolt holes spaced substantially equally apart and positioned up to 30 degrees apart in the top surface of said light support extension canister; and
   (g) rotation locking means for securing said light support extension canister against further rotation through said screw threading means connected to said extension adapter flange.

\* \* \* \* \*